(12) United States Patent
Safavi et al.

(10) Patent No.: US 6,262,509 B1
(45) Date of Patent: Jul. 17, 2001

(54) PROTECTIVE CONDUCTOR CONNECTION ON A LAMINATED STATOR CORE OF AN ELECTRIC MOTOR

(75) Inventors: Fereidun Safavi, Aerzen; Dieter Hadeler, Oldenburg; Dieter Hauke, Wardenburg, all of (DE)

(73) Assignee: FHP Motors GmbH, Oldenburg (DE)

( * ) Notice: Subject to any disclaimer, the term of this patent is extended or adjusted under 35 U.S.C. 154(b) by 0 days.

(21) Appl. No.: 09/457,367

(22) Filed: Dec. 9, 1999

(30) Foreign Application Priority Data

Dec. 17, 1998 (DE) .............................................. 198 58 208

(51) Int. Cl.⁷ ...................................................... H02K 1/00
(52) U.S. Cl. ........................ 310/216; 310/214; 310/215; 310/71
(58) Field of Search ................................... 310/216, 214, 310/215, 68 R, 71

(56) References Cited

U.S. PATENT DOCUMENTS

| 4,602,178 | * | 7/1986 | Larsson | 310/71 |
| 5,640,064 | * | 6/1997 | Boyd, Jr. et al. | 310/211 |
| 5,821,649 | * | 10/1998 | Langhorst | 310/68 R |
| 5,861,689 | * | 1/1999 | Snider et al. | 310/71 |

FOREIGN PATENT DOCUMENTS

| 7630468 | 2/1977 | (DE) . |
| 0026833 B1 | 4/1981 | (EP) . |

* cited by examiner

Primary Examiner—Elvin Enad
Assistant Examiner—Thanh Lam
(74) Attorney, Agent, or Firm—Venable; George H. Spencer; Robert Kinberg

(57) ABSTRACT

A protective conductor connection for a laminated stator core of an electric motor in which a grounding tongue is stamped into one of two sheet-metal segments that form the fronts of the stator core. A protective conductor is fixedly connected with the grounding tongue. Also provided is a method making the conductor connection.

5 Claims, 1 Drawing Sheet

PROTECTIVE CONDUCTOR CONNECTION ON A LAMINATED STATOR CORE OF AN ELECTRIC MOTOR

CROSS-REFERENCE TO RELATED APPLICATION

This application claims the priority of German Patent Application Ser. No. 198 58 208.0, filed on Dec. 17, 1998, the subject matter of which is incorporated herein by reference.

BACKGROUND OF THE INVENTION

The present invention relates to a protective conductor connection for a laminated stator core of an electric motor.

German Patent DE-U 76 30 468 discloses a protective conductor connection for motors provided with a protective conductor connection that is inserted into a frontal opening of the stator core and/or the end shield and is clamped-in form-fittingly and/or frictionally by this end shield. The disadvantage in this case is that the insertion groove must be milled or otherwise worked into the end shield or the stator core at a later date.

Another protective conductor connection for motors is disclosed in European Patent 0 026 833 B1. The protective conductor in this invention can be inserted with an insulated end into an insertion bore, formed by holes that are located one behind the other and are worked into the individual sheet-metal segments while these are stamped out. The protective conductor is secured in the preferably axially extending insertion bore, which is located directly below the outer circumferential surface of the stator core, in that the insulated end is clamped in by a wedging tool that is arranged on the outside, above the insertion bore. The drawback of such an arrangement is that a defined insertion of the protective conductor connection into the bore is not possible without additional means. In particular, additional work must be done to prevent the protective conductor from being inserted past the insulated part of the end.

It is, therefore, the object of the present invention to provide a protective conductor connection on a laminated stator core of an electric motor, which is easy to produce and ensures secure electrical contacting.

SUMMARY OF THE INVENTION

The above object is achieved by providing one of the two sheet-metal segments that form the frontal sides of the stator core, with a stamped-in grounding tongue, with which a protective conductor can be fixedly connected.

Technologically, the simplest way to produce the protective conductor connection is to produce it solely in one stamping operation, along with the final sheet metal segment for the laminated stator core. Following this, all the sheet-metal segments belonging to the stator core are combined The productive conductor is preferably provided with a pin bushing at its insulated end, which pin bushing can be fitted over the free end of the grounding tongue and can be snapped in.

Additional advantageous embodiments of the subject matter of the invention are described below.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

Figure 1:
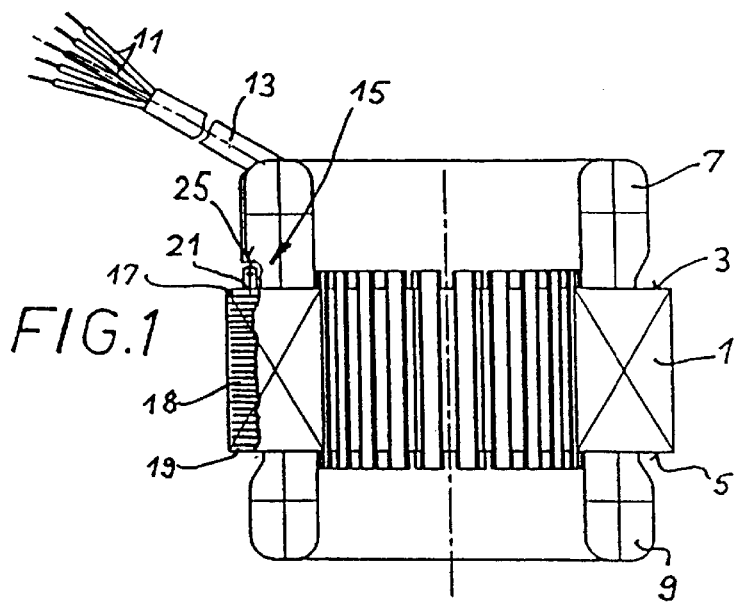
FIG. 1 shows a stator core with stator windings.
Figure 2:
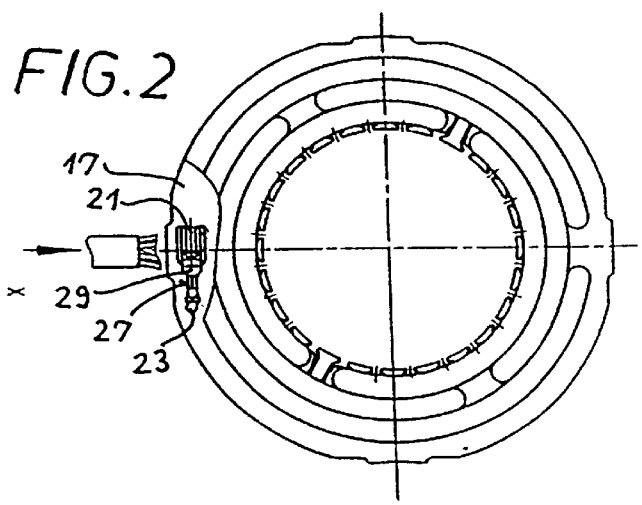
FIG. 2 shows a view from above of a front surface of the stator core.
Figure 3:
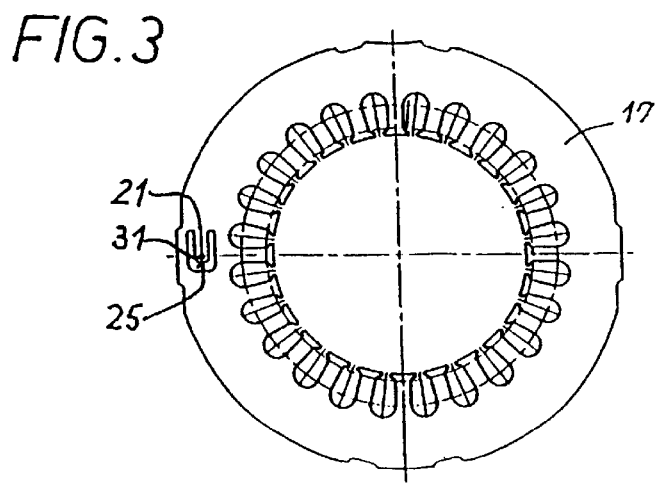
FIG. 3 shows a sheet metal segment with grounding tongue.

Referring now to the drawing, FIG. 1 shows a laminated stator core 1 with winding heads 7, 9 for the stator windings of an electric motor, which stator windings project over its front. The connection wrapping wires 11, which project from the stator windings, are inside a connection cable 13. A protective conductor connection 15 is fixedly connected to one of the two sheet-metal segments 17, 19 that form the front 3, 5 of the stator core 1. In accordance with FIG. 1, the sheet metal segment 17 contains the protective conductor connection 15, which is a grounding tongue 21 that is stamped into this sheet metal segment 17. The connection between a protective conductor 23 and the grounding tongue 21 is made easier in that its free end 25 is bent away from the plane for the sheet metal segment 17 and is formed such that is projects freely opposite the front 3 of stator core 1. The insulated end 27 of the protective conductor 23 is preferably provided with an insertion sleeve 29 which can be fitted onto the free end 25 of the grounding tongue 21. A secure connection between the protective conductor 23 and the grounding tongue 21 is achieved by providing the free end 25 of the grounding tongue 21 with a snap-in recess 31, into which can be placed a projecting latching element in the insertion sleeve 29 of protective conductor 23.

Of course, it is also possible within the framework of the invention to solder the grounding tongue 21 to the insulated end 27 of the protective conductor 23.

Technologically, the simplest way to produce the protective conductor connection 15 according to the invention is if the individual sheet-metal segments 18, which also include the two sheet metal segment 17, 19 that form the fronts 3, 5 of the stator core, are fitted together loosely immediately after the stamping operation to form a stator core 1. During the stamping operation, the last sheet metal segment 17 is simultaneously provided with a stamped-in grounding tongue 21, the free end 25 of which is bent away from the plane of this sheet metal segment 17. After the last sheet metal segment 17 is loosely placed onto the stack of sheet-metal segments 18, 19, all the sheet-metal segments 17, 18, 19 are pressed together and fixedly connected. During the assembly of the electric motor, it is then easily possible to fit the protective conductor 23 with its insertion sleeve 29 over the grounding tongue 21 and snap it in place.

It will be understood that the above description of the present invention is susceptible to various modifications, changes and adaptations, and the same are intended to be comprehended within the meaning and range of equivalents of the appended claims.

What is claimed is:

1. A protective conductor connection for a stator core of an electric motor in which the stator core is made of sheet-metal segments, the improvement wherein one sheet-metal segment at a frontal side of the stator core has a stamped-in grounding tongue bent away from a plane of the sheet-metal segment.

2. The protective conductor connection according to claim 1, wherein said grounding tongue which is bent away projects opposite said frontal side of the stator core.

3. The protective conductor connection according to claim 2, wherein said grounding tongue which is bent away has a free end and is arranged such that an insertion sleeve of a protective conductor can be fitted onto the free end of the grounding tongue.

4. A protective conductor connection according to claim 3, wherein said grounding tongue which is bent away has a recess in which a snap-in element of said insertion sleeve can be engage.

5. A method for making a protective conductor connection for a stator core of an electric motor, comprising:

stamping a grounding tongue in a sheet-metal segment such that the grounding tongue is bent away from a plane of the sheet-metal segment; and pressing together the sheet-metal segment with the grounding tongue together with at least one other sheet-metal segment to form the stator core so that the sheet-metal segment having the grounding tongue is positioned at a frontal side of the stator core.

* * * * *